United States Patent [19]
Ikeda

[11] Patent Number: 5,595,373
[45] Date of Patent: Jan. 21, 1997

[54] FLUID-FILLED DAMPING DEVICE HAVING TWO AXIALLY SPACED ANNULAR FLUID CHAMBERS COMMUNICATING WITH EACH OTHER THROUGH ORIFICE

[75] Inventor: Katuhisa Ikeda, Kasugai, Japan

[73] Assignee: Tokai Rubber Industries, Ltd., Japan

[21] Appl. No.: 570,937

[22] Filed: Dec. 12, 1995

[30] Foreign Application Priority Data

Dec. 21, 1994 [JP] Japan .................................. 6-318163

[51] Int. Cl.$^6$ ........................................................ F16M 1/00
[52] U.S. Cl. .................................. 267/140.12; 267/141.4; 267/293
[58] Field of Search ....................... 267/140.12, 140.11, 267/140.13, 141.2, 141.3, 141.4, 141.5, 293, 294, 292; 248/562, 636; 180/300, 312

[56] References Cited

U.S. PATENT DOCUMENTS

| | | | |
|---|---|---|---|
| 4,702,346 | 10/1987 | Uno et al. | 267/140.12 |
| 4,756,514 | 7/1988 | Kanda | 267/140.12 |
| 4,971,299 | 11/1990 | Doi | 267/140.12 |
| 5,429,343 | 7/1995 | Maeno et al. | 267/140.12 |
| 5,496,018 | 3/1996 | McLelland et al. | 267/140.12 |

FOREIGN PATENT DOCUMENTS 62-158236  10/1987  Japan .

*Primary Examiner*—Peter M. Poon
*Attorney, Agent, or Firm*—Parkhurst, Wendel & Burr, L.L.P.

[57] ABSTRACT

A cylindrical fluid-filled damping device wherein a center shaft member and an outer cylindrical member are elastically connected by an elastic body having a first and a second annular pocket which are axially spaced apart from each other, and an intermediate sleeve secured to the outer circumferential surface of the elastic body has an axially intermediate small-diameter portion, and two first windows and two second windows which are formed on respective axially opposite sides of the small-diameter portion. The first and second annular pockets are open in the outer surface of the intermediate sleeve through the respective first and second windows. An orifice member is interposed between the axially intermediate small-diameter portion of the intermediate sleeve and the outer cylindrical member secured to the outer surface of the intermediate sleeve. The orifice member and the outer cylindrical member cooperate with the elastic body to define a first and a second annular fluid chamber communicating with each other through an orifice passage partially defined by the orifice member.

10 Claims, 5 Drawing Sheets

5,595,373

FLUID-FILLED DAMPING DEVICE HAVING TWO AXIALLY SPACED ANNULAR FLUID CHAMBERS COMMUNICATING WITH EACH OTHER THROUGH ORIFICE

BACKGROUND OF THE INVENTION

1. Field of the Invention

The present invention relates in general to a cylindrical damping device suitably used as a member mount for a suspension system of a motor vehicle, for example, and more particularly to a cylindrical fluid-filled damping device capable of exhibiting a damping effect with respect to a vibrational load received in its axial direction, on the basis of flows of a fluid therethrough.

2. Discussion of the Prior Art

As a damping device of a type adapted to be interposed between two members of a vibration system so as to elastically connect these two members, there is known a cylindrical damping device in which a center shaft member and an outer cylindrical member are disposed in a radially spaced-part relation with each other and are elastically connected to each other by an elastic body interposed therebetween. The cylindrical damping device is adapted to damp primarily a vibrational load applied thereto in its axial direction, namely, in the axial directions of the center shaft member and outer cylindrical member. Examples of this type of cylindrical damping device include a suspension member mount, a strut bar cushion and a suspension upper support for a motor vehicle.

Recently, there have been proposed cylindrical fluid-filled damping devices which are filled with a fluid and are adapted to damp input vibrations on the basis of flows or resonance of the fluid, with improved damping characteristics. An example of such a cylindrical fluid-filled damping device was developed by the assignee of this application and is disclosed in JP-U-62-158236 (laid-open publication of Japanese Utility Model Application), wherein a first and a second annular fluid chamber are formed in axially spaced-apart relation with each other, between a center shaft member and an outer cylindrical member. These first and second annular fluid chambers are filled with a non-compressible fluid and are held in communication with each other through an orifice passage.

The first and second annular fluid chambers are axially spaced apart from each other by a partition wall of the elastic body, and the axially outer ends of the fluid chambers are defined by axial end walls of the elastic body. The axially intermediate partition wall of the elastic body has a smaller radial height than the axial end walls. An orifice member is fixedly interposed between the outer circumferential surface of the partition wall and the outer cylindrical member, so that the orifice member cooperates with the outer cylindrical member to define the orifice passage. Upon application of an axial vibrational load to the damping device, the fluid pressures within the first and second annular fluid chambers are changed relative to each other due to different amounts of elastic deformation of the intermediate partition wall and the axial end walls of the elastic body, whereby the fluid is forced to flow through the orifice passage.

Generally, the cylindrical fluid-filled damping device is manufactured by: first forming the elastic body which is bonded by vulcanization to the outer circumferential surface of the center shaft member and which has a first and a second annular pocket on the opposite axial sides of the intermediate partition wall; fitting the orifice member on the outer circumferential surface of the intermediate partition wall; and finally mounting the outer cylindrical member on the outer circumferential surface of an intermediate product consisting of the center shaft member, elastic body and orifice member, while the intermediate product is submerged in a mass of the non-compressible fluid, so that a first and a second fluid chamber formed by the first and second annular pockets closed by the outer cylindrical member are filled with the non-compressible fluid.

In such a cylindrical fluid-filled damping device, metal rings are bonded to the outer circumferential surfaces of the intermediate partition wall and the two axial end walls of the elastic body during vulcanization of the elastic body, for the purpose of assuring fluid tightness between the annular fluid chambers and the outer cylindrical member, more specifically, fluid tightness between the outer circumferential surfaces of the axial end walls of the elastic body and the outer cylindrical member, and for the purpose of fluid-tightly attaching the orifice member to the outer circumferential surface of the partition wall of the elastic body.

To produce the fluid-filled damping device with the three metal rings incorporated therein as described above, these three metal rings must be set and positioned relative to the center shaft member, within a mold in which a rubber material is injected and vulcanized to form the elastic body. This procedure tends to be cumbersome and time-consuming in suitably setting the center shaft member and metal rings, and the mold tends to be complicated. Thus, the provision of the metal rings on the elastic body leads to reduced efficiency and increased cost of manufacture of the cylindrical fluid-filled damping device. In this respect, the construction of the known damping device is not satisfactory.

SUMMARY OF THE INVENTION

It is therefore an object of the present invention to provide a cylindrical fluid-filled damping device which is easy and economical to manufacture and capable of effectively damping an axial vibrational load applied thereto, on the basis of flows of a fluid.

The above object may be achieved according to the principle of the present invention, which provides a cylindrical fluid-filled damping device comprising: (a) a center shaft member; (b) an outer cylindrical member disposed radially outwardly of the center shaft member; (c) a generally annular elastic body interposed between and elastically connecting the center shaft member and the outer cylindrical member, the elastic body having a first and a second annular pocket which are spaced apart from each other in an axial direction of the elastic body; (d) an intermediate sleeve secured to an outer circumferential surface of the elastic body, the intermediate sleeve having an axially intermediate small-diameter portion, and a pair of first windows and a pair of second windows which pairs are formed on respective axially opposite sides of the small-diameter portion, each of the first and second windows having a circumferential length not larger than a half of an entire circumference of the intermediate sleeve, the first and second annular pockets being open in an outer circumferential surface of the intermediate sleeve through the pairs of first and second windows, respectively, the outer cylindrical member being secured to the outer circumferential surface of the intermediate sleeve; and (d) an orifice member interposed between the axially intermediate small-diameter portion of the intermediate sleeve and the outer cylindrical member. The orifice member and the outer cylindrical member close the first and second windows and cooperate with the elastic body to define a first and a second annular fluid chamber, and the orifice member partially defines an orifice passage for fluid communication between the first and second annular fluid chambers.

In the cylindrical fluid-filled damping device of the present invention constructed as described above, the integral or one-piece intermediate sleeve is bonded, by vulcanization of a rubber material of the elastic body, to the outer circumferential surface of an axially intermediate partition wall of the elastic body by which the first and second annular fluid chambers are spaced apart from each other, and to the outer circumferential surfaces of axial end walls of the elastic body which define the axially outer ends of the first and second annular fluid chambers. Therefore, the number of components of the damping device is reduced, and the single intermediate sleeve may be comparatively easily positioned relative to the center shaft member when the intermediate sleeve and center shaft member are set within a mold for forming the elastic body between the intermediate sleeve and center shaft member, by vulcanization of the rubber material. Accordingly, the present damping device can be manufactured with considerably improved efficiency.

According to a first preferred form of this invention, the elastic body includes an axially intermediate partition wall by which the first and second annular pockets are spaced apart from each other in the axial direction, and two axial end walls which define axially outer ends of the first and second annular pockets, respectively. Each of the two axial end walls has two first circumferential portions which are opposed to each other in a first diametric direction of the elastic body, and two second circumferential portions which are opposed to each other in a second diametric direction perpendicular to the first diametric direction and which have an axial dimension different from that of the two first circumferential portions. In this form of the invention, the damping device may have a relatively high ratio of spring constants in the mutually perpendicular first and second diametric directions. For instance, the first diametric direction is the longitudinal or running direction of the motor vehicle, while the second diametric direction is the transverse or lateral direction of the vehicle. This arrangement is advantageously applicable to a suspension member mount which is required to exhibit different spring characteristics in the longitudinal and transverse directions of the motor vehicle. The axially intermediate partition wall may have two first circumferential portions and two second circumferential portions similar to those of each axial end wall. This arrangement permits a further higher ratio of the spring constants in the mutually perpendicular diametric directions of the elastic body. The two relatively thin-walled circumferential portions of the axial end walls may be inclined so that the radially outer ends of the thin-walled circumferential portions are located axially outward of the radially inner ends. This arrangement has the same effect as the above arrangement.

According to a second preferred form of the invention, the elastic body includes two axial end walls which define axially outer ends of the first and second annular pockets, respectively. Each of these two axial end walls has two circumferential portions which are opposed to each other in a diametric direction of the elastic body. In this form of the damping device, the center shaft member has a pair of radially outwardly extending restricting projections which are at least partially embedded in the two circumferential portions of each axial end wall of the elastic body, respectively. The restricting projections are made of a metal, synthetic resin or any other material which is harder than the elastic body. The restricting projections may be integral parts of a restrictor member bonded to the outer circumferential surface of the center shaft member. In the present form of the damping device, the restricting projections which are at least partially embedded in the respective circumferential portions of each axial end wall of the elastic body function to harden the spring characteristic of the axial end wall in the diametric direction in which those circumferential portions are opposed to each other. Therefore, this arrangement is effective to increase a ratio of the spring constants of the elastic body in the two mutually perpendicular diametric directions which include the diametric direction of the two circumferential portions indicated above. The present arrangement according to the second preferred form of the invention may be advantageously employed together with the arrangement according to the first preferred form of the invention. The restricting projections according to the present second preferred form of the invention are effective to restrict elastic deformation of the axial end walls of the elastic body, and are therefore effective to assure relatively large amounts of axial displacements between the axial end walls and the axially intermediate partition wall upon application of a vibrational load in the axial direction of the damping device. Consequently, the restricting projections assure a relatively large difference between the fluid pressures within the first and second annular fluid chambers, and a relatively large amount of flow of the fluid through the orifice passage, thereby enabling the damping device to exhibit an increased vibration damping effect on the basis of the fluid flow.

In a third preferred form of this invention, the dimension of the orifice member as measured in the axial direction of the intermediate sleeve is determined to be larger than the axial dimension of the axially intermediate small-diameter portion of the intermediate sleeve, namely, larger than the axial dimension of the axially intermediate partition wall of the elastic body. Thus, the orifice member extends from the axially intermediate portion in the axially outer directions into the first and second windows of the intermediate sleeve. The orifice member having the relatively large axial dimension provides a high degree of freedom in designing the orifice passage, that is, permits the orifice passage to be easily and suitably tuned so as to enable the damping device to exhibit the desired damping effect.

BRIEF DESCRIPTION OF THE DRAWINGS

The above and other objects, features, advantages and technical significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
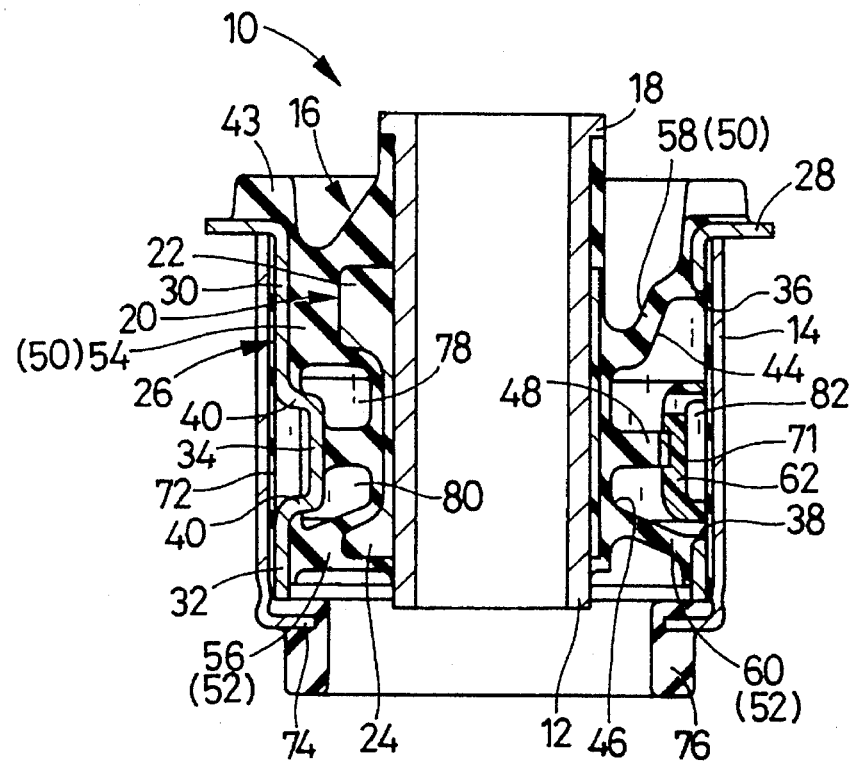
FIG. 1 is an elevational view in axial cross section of one embodiment of a cylindrical fluid-filled damping device of this invention in the form of a member mount, the view being taken along line 1—1 of FIG. 2
Figure 2:
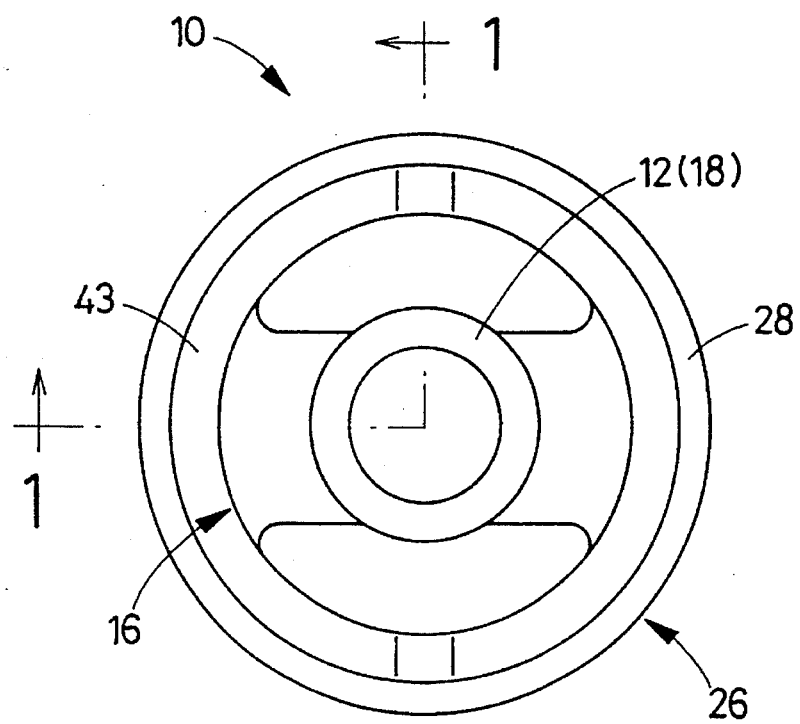
FIG. 2 is a plan view of the member mount shown in FIG. 1.

Referring first to FIGS. 1 and 2, there are shown a cylindrical fluid-filled damping device in the form of a member mount 10 for a motor vehicle, which is constructed according to one embodiment of this invention. The member mount 10 includes a center shaft member in the form of an inner sleeve 12 and an outer cylindrical member in the form of an outer sleeve 14, which are made of metal and disposed in a radially spaced-apart relation with each other with a suitable radial distance therebetween. Between these inner and outer sleeves 12, 14, there are interposed an elastic body 16 made of a rubber material, which is a generally annular member having a relatively large radial wall thickness. The inner and outer sleeves 12, 14 are elastically connected to each other by the interposed elastic body 16. The member mount 10 is installed on the motor vehicle such that the inner sleeve 12 is attached to a body of the vehicle while the outer sleeve 14 is attached to a suspension member of the vehicle, and such that the centerline (axial direction) of the member mount 10 parallel to the vertical direction as seen in FIG. 1 extends in the vertical direction of the vehicle. Further, the member mount 10 is oriented on the vehicle such that the vertical and horizontal directions as seen in the plan view of FIG. 2 are parallel to the longitudinal and lateral (transverse) directions of the vehicle. With the member mount 10 thus installed on the vehicle, a vibrational load applied to the inner and outer sleeves 12, 14 in the axial direction of the member mount 10 is most effectively damped. That is, the member mount 10 is adapted to damp a vibrational load applied thereto in a direction substantially parallel to its axial direction.

Figure 3:
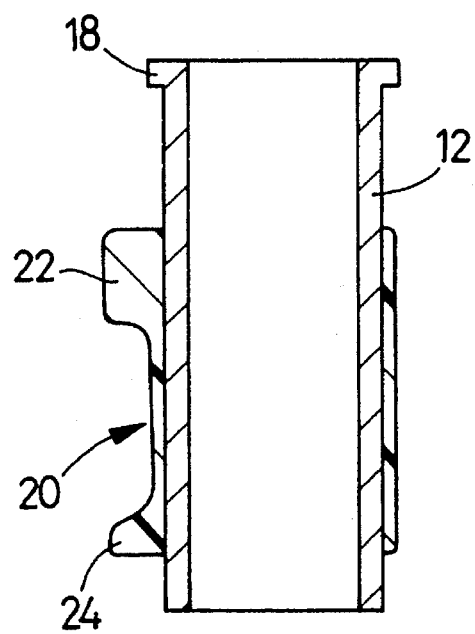
FIG. 3 is an elevational view in axis cross section of an inner sleeve of the member mount of FIG. 1, the view being taken along line 3—3 of FIG. 4.
Figure 4:
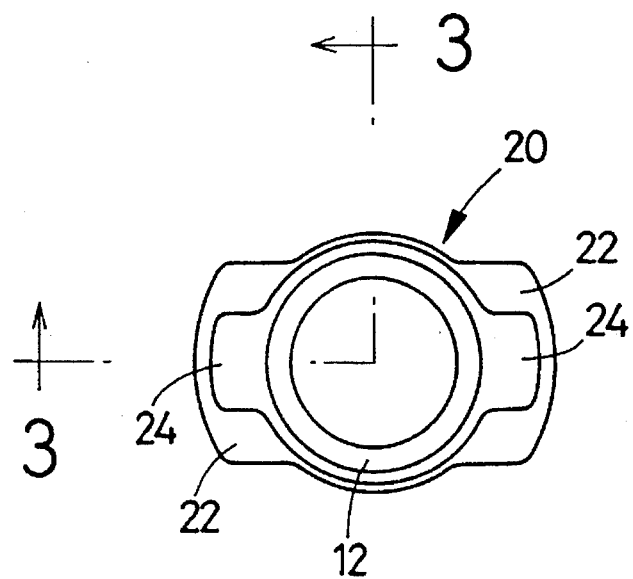
FIG. 4 is a bottom plan view of the inner sleeve of FIG. 3.

As also shown in FIGS. 3 and 4, the inner sleeve 12 is a cylindrical member having an outward flange 18 integrally formed at one of its opposite axial ends. The inner sleeve 12 has a restrictor member 20 secured to the outer circumferential surface of an axially intermediate portion thereof. The restrictor member 20 is formed of a synthetic resin material having a hardness higher than that of the rubber material of the elastic body 16. The restrictor member 20, which is generally cylindrical, has a pair of radially outwardly extending first restricting projections 22, 22 integrally formed at one of its opposite axial ends, and a pair of radially outwardly extending second restricting projections 24, 24 integrally formed at the other axial end. The first projections 22 are opposed to each other in a diametric direction of the inner sleeve and the second projections 24 are opposed to each other in the same diametric direction, as indicated in FIG. 4. The first restricting projections 22 have larger axial, radial and circumferential dimensions than the second restricting projections 24. The restrictor member 20 is formed on the inner sleeve 12, by injecting a resin material into a mold cavity in which the inner sleeve 12 has been suitably positioned. The thus molded restrictor member 20 is bonded to the axially intermediate portion of the inner sleeve 12.

Figure 5:
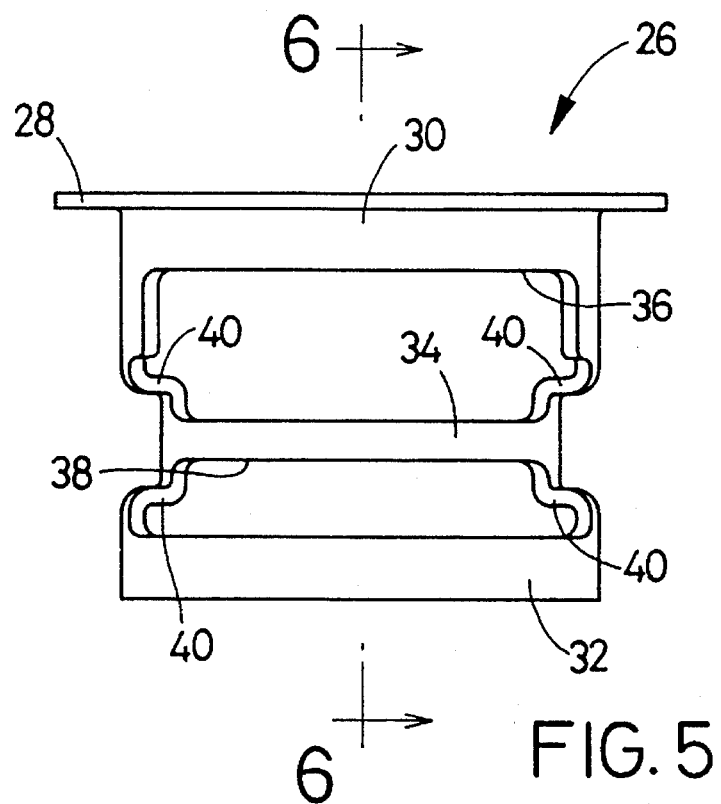
FIG. 5 is a front elevational view of an intermediate metal sleeve provided in the member mount of FIG. 1.
Figure 6:
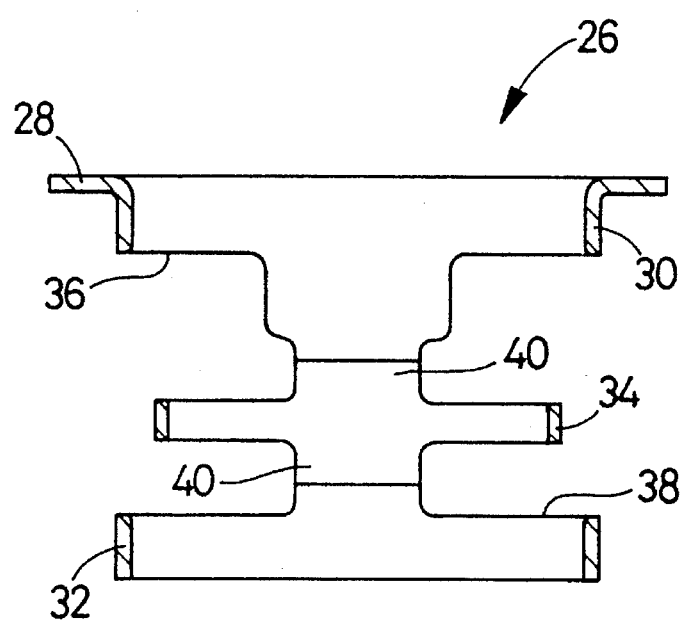
FIG. 6 is a cross sectional view taken along line 6—6 of FIG. 5.

An intermediate metal sleeve 26 is disposed radially outwardly of the inner sleeve 12 with a predetermined radial distance therebetween, in substantially coaxial or concentric relation with each other. As also shown in FIGS. 5 and 6, this intermediate metal sleeve 26 has a generally cylindrical member having a relatively large diameter, and an annular abutting portion 28 in the form of a flange integrally formed at one axial end thereof so as to extend in the radially outward direction. The intermediate metal sleeve 26 has a circumferential groove open in the outer circumferential surface of an axially intermediate portion thereof, so that the metal sleeve 26 has large-diameter end portions 30, 32, and a small-diameter intermediate portion 34 which corresponds to the circumferential groove and which is interposed between the large-diameter end portions 30, 32. The metal sleeve 26 has a pair of first windows 36, 36 on one of opposite sides (upper side as seen in FIGS. 5 and 6) of the small-diameter portion 34 as seen in the axial direction, and a pair of second windows 38, 38 on the other side (lower side) of the small-diameter portion 34. Namely, the first windows 36, 36 are formed between the large-diameter end portion 30 and the small-diameter intermediate portion 34, while the second windows 38, 38 are formed between the small-diameter intermediate portion 34 and the large-diameter end portion 32. Each of these windows 36, 38 has a circumferential length slightly smaller than the half of the entire circumference of the large-diameter end portions 30, 32. Described more specifically, two pairs of connecting portions 40, 40 in the form of shoulders are provided between the small-diameter intermediate portion 34 and the two large-diameter end portions 30, 32, so as to connect the small-diameter portion 34 to the large-diameter portions 30, 32 in the axial direction. The first pair consists of a shoulder 40 between the portions 30, 34 and between the first corresponding circumferential ends of the first windows 36, and another shoulder 40 between the portions 34 and between the corresponding circumferential ends of the second windows 38. The second pair consists of a shoulder 40 between the portions 30, 34 and between the second corresponding circumferential ends of the first windows 36 which are opposite to the first circumferential ends, and a shoulder 40 between the portions 32, 34 and between the second corresponding circumferential ends of the second windows 38 which are opposite to the first circumferential ends. The first pair of connecting portions or shoulders 40 is opposite to the second pair of connecting portions or shoulders 40 in a diametric direction of the sleeve 26.

Figure 7:
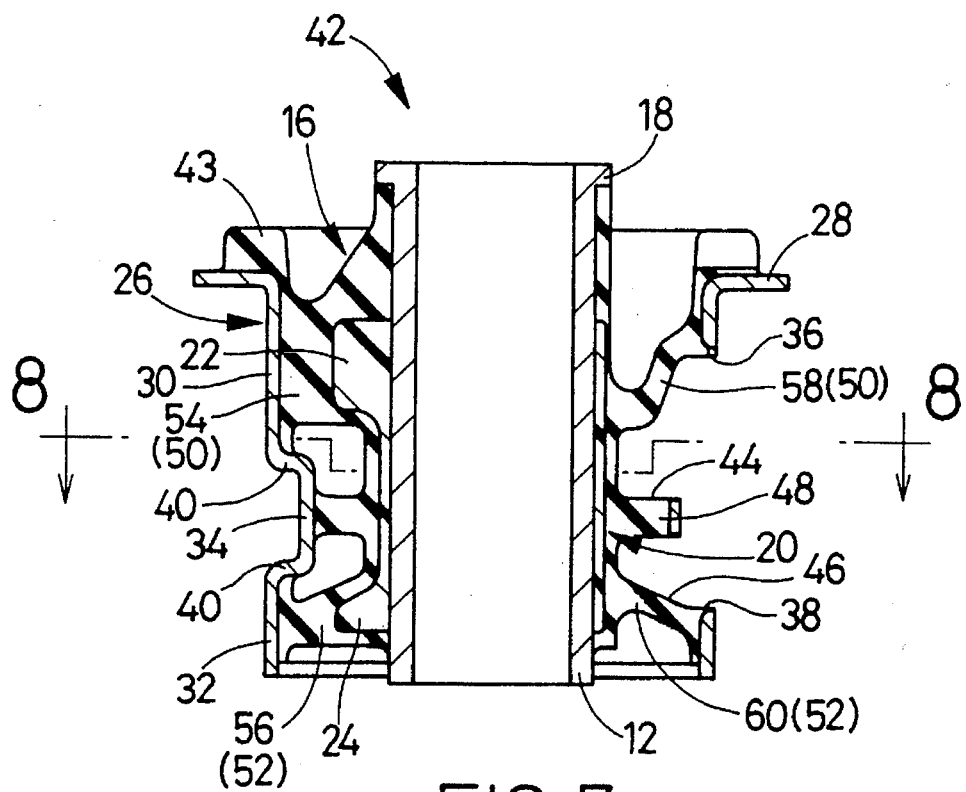
FIG. 7 is an elevational view in axial cross section of an intermediate product produced in vulcanization process during manufacture of the member mount of FIG. 1, the view being taken along line 7—7 of FIG. 8.
Figure 8:
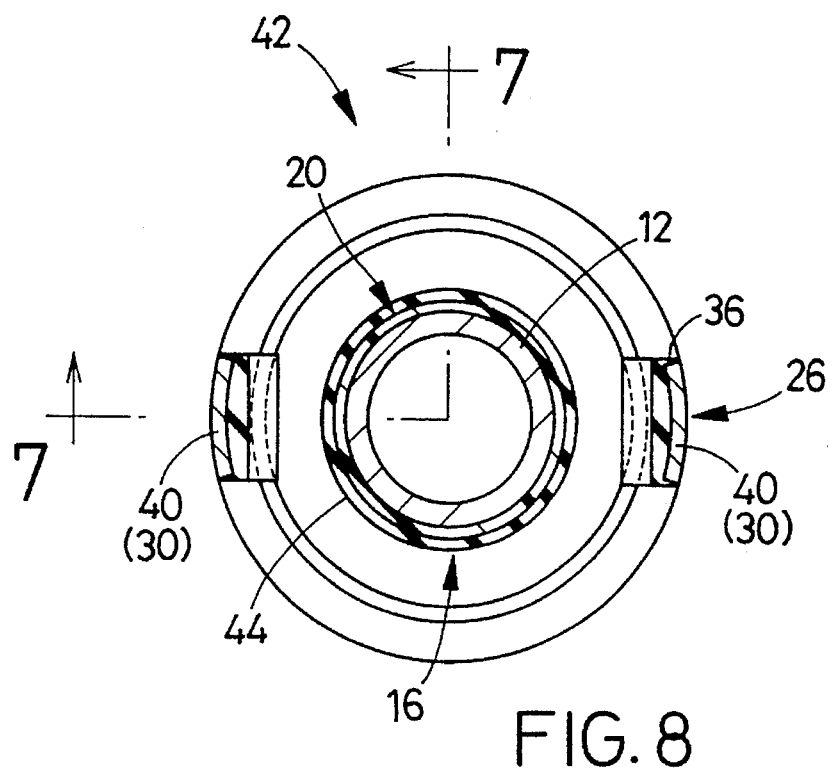
FIG. 8 is a cross sectional view taken along line 8—8 of FIG. 7.

As shown in FIGS. 7 and 8, the elastic body 16 is interposed between the inner sleeve 12 and the intermediate metal sleeve 26 which are radially spaced from each other by a predetermined radial distance, so that the elastic body elastically connects the inner and intermediate sleeves 12, 26. These sleeves 12, 26 and elastic body 16 provide an intermediate product 42 in which the elastic body 16 is bonded at its inner and outer circumferential surfaces to the inner sleeve 12 and the intermediate metal sleeve 26, by vulcanization of a rubber material of the elastic body 16 in a suitable mold in which the sleeves 12, 26 are suitably positioned relative to each other. An annular buffer rubber block 43 is formed as an integral part of the elastic body 16, so as to extend from the axially outer surface of the annular abutting portion 28 of the intermediate metal sleeve 26.

The elastic body 16 has a first annular pocket 44 and a second annular pocket 46 which are formed in the circumferential direction and which are spaced apart from each other in the axial direction. The first and second annular pockets 44, 46 are open in the outer circumferential surface of the intermediate metal sleeve 26 through the respective pairs of the first and second windows 36, 38. These annular pockets 44, 46 are formed continuously in the circumferential direction of the elastic body 16, even at their portions corresponding to the connecting portions 40 of the intermediate metal sleeve 26.

The first and second annular pockets 44, 46 are separated from each other by a partition wall 48 formed therebetween, as seen in the axial direction of the elastic body 16. The partition wall 48 is bonded by vulcanization to the inner surface of the small-diameter intermediate portion 34 of the metal sleeve 26. The elastic body 16 is also formed with two axial end walls 50, 52 which define the opposite axial ends of the first and second annular pockets 44, 46. Each of the two axial end walls 50, 52 has diametrically opposite thick-walled circumferential portions 54, 56 corresponding to the connecting portions 40, 40 of the metal sleeve 56 which are opposed to each other in the diametric direction parallel to the transverse or lateral direction of the vehicle (horizontal direction as seen in FIGS. 2 and 8). Each axial end wall 50, 52 also has diametrically opposite thin-walled circumferential portions 58, 60 which are opposed to each other in a diametric direction perpendicular to the diametric direction in which the thick-walled circumferential portions 54, 56 are opposed to each other. Namely, the thin-walled circumferential portions 58, 60 are opposed to each other in the longitudinal direction of the vehicle (vertical direction as seen in FIGS. 2 and 8). The thin-walled circumferential portions 58, 60 are inclined so that the radially outer ends thereof are located axially outward of the radially inner ends thereof, as shown in FIGS. 1 and 7. The first and second restricting projections 22, 24 of the restrictor member 20 are embedded in the thick-walled circumferential portions 54, 56. In this arrangement, the elastic body 16 has a relatively hard or stiff spring characteristic in the lateral direction of the vehicle in which the thick-walled circumferential portions 54, 56 are opposed to each other diametrically of the elastic body 16, and a relatively soft spring characteristic in the longitudinal direction of the vehicle in which the thin-walled circumferential portions 58, 60 are opposed to each other diametrically of the elastic body 16. Thus, the present member mount 10 has a relatively large ratio of spring constants in the mutually perpendicular diametric directions.

Figure 9:
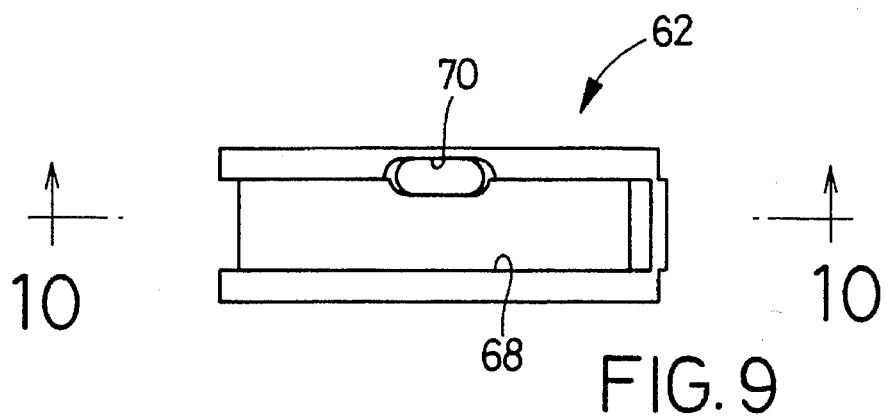
FIG. 9 is a plan view of an orifice-defining member provided in the member mount of FIG. 1.
Figure 10:
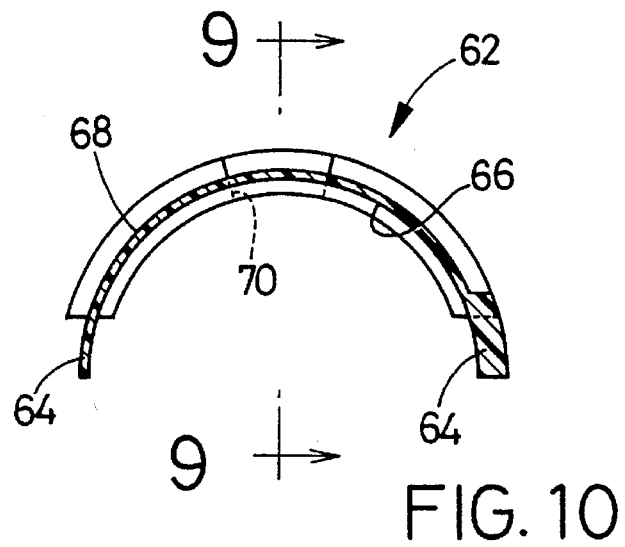
FIG. 10 is a cross sectional view taken along line 10—10 of FIG. 9.
Figure 11:
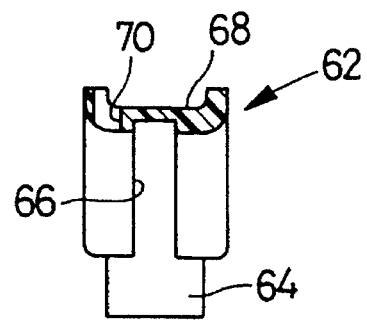
FIG. 11 is a cross sectional view taken along line 11—11 of FIG. 10.

As shown in FIG. 1, the intermediate product 42 further includes a pair of semi-cylindrical orifice-defining members 62, 62. As shown in FIGS. 9–11, each orifice-defining member 62 has a semi-circular cross sectional shape as shown in FIG. 10, and engaging lugs 64, 64 at the opposite circumferential ends. The lugs 64 have a relatively small dimension as seen in the horizontal direction of FIG. 11. The orifice-defining member 62 has a recessed portion 66 in the inner circumferential surface, as shown in FIGS. 10 and 11, and an arcuate groove 68 formed in its outer semi-cylindrical surface. The arcuate groove 68 extends from one end of the member 62 to a position near the other end, as shown in FIGS. 9–10. The groove 68 also has a communication hole 70 formed through an intermediate portion thereof, for communication between the recessed portion 66 and groove 68. The communication hole 70 is located at one of opposite edges of the arcuate groove 68 as seen in FIG. 9.

The orifice-defining members 62, 62 are fitted and positioned on the small-diameter intermediate portion 34 of the intermediate metal sleeve 26 such that the recessed portion 66 and the engaging lugs 64, 64 are held in engagement with the intermediate portion 34, and such that the intermediate portions of the orifice-defining members 62, 62 are aligned with the circumferentially intermediate portions of the first and second windows 36, 38. As a result, the arcuate grooves 68 of the two semi-cylindrical orifice-defining members 62, 62 are connected so as to form a substantially annular groove 71 whose circumferential length is slightly smaller than the entire circumference of an orifice member, which consists of the two orifice-defining members 62, 62. The groove 71 communicates with the first and second pockets 44, 46 through the communication holes 70. In the present embodiment, the orifice-defining members 62, 62 are made of a synthetic resin.

The outer sleeve 14 is then fitted on the intermediate product 42 with the orifice-defining members 62 attached thereto. The outer sleeve 14 is radially compressed against the outer circumferential surface of the intermediate metal sleeve 26 by drawing the outer sleeve 14 with eight dies arranged around the outer sleeve 14. The outer sleeve 14 is a cylindrical member with a relatively large diameter having a relatively small wall thickness, and is coated at its inner circumferential surface with a sealing rubber layer 72 having a small thickness. The outer sleeve 14 has an annular abutting portion 74 in the form of a flange integrally formed at one axial end thereof so as to extend in the radially inward direction. An annular buffer rubber block 76 is formed integrally with the sealing rubber layer 72, so as to extend from the annular abutting portion 74 in the axially outward direction.

With the outer sleeve 14 being thus fitted on the intermediate product 42 with the orifice-defining members 62 attached thereto, the first and second annular pockets 44, 46 of the elastic body 16 (i.e., first and second windows 36, 38 of the intermediate metal sleeve 26) are fluid-tightly closed by the orifice-defining members 62 and the outer sleeve 14 with the sealing rubber layer 72. Further, the substantially annular groove 71 of the orifice member is closed by the outer sleeve 14. The member mount 10 thus produced has a first and a second annular fluid chamber 78, 80 corresponding to the first and second pockets 44, 46, and an orifice passage 82 corresponding to the groove 71. The fluid chambers 78, 80 and orifice passage 82 are filled with a non-compressible fluid, and the orifice passage 82 which provides fluid communication between the first and second fluid chambers 78, 80. The non-compressible fluid may be selected from among water, alkylene glycol, polyalkylene glycol and silicone oil. For the member mount 10 to exhibit a high vibration damping effect on the basis of resonance of the non-compressible fluid, the non-compressible fluid is preferably a viscous fluid whose kinetic viscosity is 0.1 Pa.s or lower. The fluid chambers 78, 80 and orifice passage 82 may be advantageously filled with such non-compressible fluid, by mounting the outer sleeve 14 on the intermediate product 42 within a mass of the non-compressible fluid in a suitable container.

Upon application of a vibrational load between the inner and outer sleeves 12, 14 of the thus constructed member mount 10 in its axial direction, the fluid pressures in the first and second annular fluid chambers 78, 80 are changed relative to each other due to elastic deformation of the partition wall 48 and axial end walls 50, 52 of the elastic body 16, whereby the non-compressible fluid is forced to flow between the first and second annular fluid chambers 78, 80 through the orifice passage 82. As a result, the member mount 10 exhibits a damping effect with respect to the input vibration on the basis of the resonance of the fluid. The damping effect or characteristic of the member mount 10 can be adjusted as needed by suitably tuning the dimensions such as the length and cross sectional area of the orifice passage 82.

In the present cylindrical fluid-filled damping device in the form of the member mount 10, the intermediate metal sleeve 26 is bonded, upon vulcanization of the rubber material of the elastic body 16, to the outer circumferential surfaces of the partition wall 48 and axial end walls 50, 52 of the elastic body 16, so as to assure fluid tightness and bonding between those outer circumferential surfaces of the walls 38, 50, 52 and the inner circumferential surfaces of the outer sleeve 14 and orifice-defining members 62, 62. Since this intermediate metal sleeve 26 is an integral or one-piece member, the metal sleeve 26 can be easily set and positioned within a mold, when the elastic body 16 is formed between the inner and intermediate sleeves 12, 26. Thus, the use of the one-piece intermediate sleeve 26 permits improved efficiency and reduced cost of manufacture of the member mount 10.

Another advantage of the present member mount 10 lies in that the orifice-defining members 62, 62 function to restrict deformation of a radially outer portion of the partition wall 48, while the first and second restricting projections 22, 24 of the restrictor member 20 function to restrict deformation of radially inner portions of the axial end portions 50, 52. This arrangement assures relatively large relative axial movements of the partition wall 48 and axial end walls 50, 52 due to the vibrations applied in the axial direction of the member mount 10. Accordingly, the fluid pressure difference between the first and second fluid chambers 78, 80 upon application of the axial vibrations is made relatively large, leading to a relatively large amount of flow of the fluid through the orifice passage 82, thereby permitting the present member mount 10 to exhibit an increased effect of damping of the input vibrations on the basis of the resonance of the fluid.

A further advantage of the present member mount 10 resides in that the axial end walls 50, 52 have the thick-walled circumferential portions 54, 56 which are opposed to each other in a first diametric direction of the elastic body 16, and the thin-walled circumferential portions 58, 60 which are opposed to each other in a second diametric direction perpendicular to the first diametric direction, and in that the first and second restricting projections 22, 24 are embedded in the thick-walled portions 54, 56. This arrangement enables the member mount 10 to provide a relatively large ratio of spring constants in the longitudinal and transverse directions of the motor vehicle, namely, a relatively hard or stiff spring characteristic in the transverse direction of the vehicle for ensuring improved steering stability of the vehicle, and a relatively soft spring characteristic in the longitudinal or running direction of the vehicle for effectively damping harsh vibrations, thereby ensuring enhanced driving comfort of the vehicle.

It is also appreciated that the orifice-defining members 62, 62 have a relatively large dimension in the axial direction of the member mount 10, extending from the partition wall 48 in the axially outer directions into the first and second annular pockets 44, 46 (first and second windows 36, 38). Namely, the axial dimension of the orifice member consisting of the two orifice-defining members 62, 62 is made larger than the axial dimension of the axially intermediate small-diameter portion 34 of the intermediate sleeve 26 (than the axial dimension of the partition wall 48 of the elastic body 16). Consequently, the orifice passage 82 can be readily formed with a cross sectional area sufficient to permit a large amount of flow of the fluid therethrough for effectively damping the input vibrations.

In the present member mount 10, the annular abutting portion 28 of the intermediate metal sleeve 26 and the buffer rubber block 43 cooperate to provide a first axial stop, while the annular abutting portion 74 of the outer sleeve 14 and the buffer rubber block 76 cooperate to provide a second axial stop. These axial stops are provided for abutting contact with suitable members on the vehicle body, for limiting the amount of axial displacement of the inner and outer sleeves 12, 14, to thereby prevent excessive deformation of the elastic body 16 and increase the durability of the member mount.

While the present invention has been described in its presently preferred embodiment for illustrative purpose only, it is to be understood that the invention is not limited to the details of the illustrated embodiment, but may be otherwise embodied.

In the illustrated embodiment, the two orifice-defining members 62, 62 and the outer sleeve 14 cooperate to define the substantially annular orifice passage 82 which lies in a plane perpendicular to the axial direction of the member mount 10. However, the orifice passage may take any other configuration such as a helical passage or a bent passage, which meets the desired damping characteristic of the fluid-filled damping device.

Although the member mount 10 of the illustrated embodiment uses the axial end walls 50, 52 having the thick-walled and thin-walled circumferential portions 54, 56, 58, 60 to provide two different spring characteristics in the two mutually perpendicular diametric directions, the member mount may be adapted to exhibit a constant spring characteristic in all diametric or radial directions.

It is to be understood that the materials of the inner sleeve 12 (center shaft member), outer sleeve 14 (outer cylindrical member), intermediate sleeve 26, orifice-defining members 62, 62 (orifice member) and restricting protrusions 22, 24 are not limited to those used in the illustrated embodiments, and may be suitably selected. For instance, the intermediate sleeve may be made of a synthetic resin.

While the suspension member mount 10 for a motor vehicle has been described as one embodiment of this invention, the principle of the invention is equally applicable to any other cylindrical fluid-filled damping device such as a body mount, a strut bar cushion and a suspension upper support of a motor vehicle, and a cylindrical damper used in various devices or vibration systems other than the motor vehicle.

It is to be understood that the present invention may be embodied with various other changes, modifications and improvements, which may occur to those skilled in the art, without departing from the spirit and scope of the invention defined in the following claims.

What is claimed is:

1. A cylindrical fluid-filled damping device comprising:

a center shaft member;

an outer cylindrical member disposed radially outwardly of said center shaft member;

a generally annular elastic body interposed between and elastically connecting said center shaft member and said outer cylindrical member, said elastic body having a first and a second annular pocket which are spaced apart from each other in an axial direction of said elastic body;

an intermediate sleeve secured to an outer circumferential surface of said elastic body, said intermediate sleeve having an axially intermediate small-diameter portion, and a pair of first windows and a pair of second windows which pairs are formed on respective axially opposite sides of said small-diameter portion, each of said first and second windows having a circumferential length not larger than a half of an entire circumference of said intermediate sleeve, said first and second annular pockets being open in an outer circumferential surface of said intermediate sleeve through said pairs of first and second windows, respectively, said outer cylindrical member being secured to said outer circumferential surface of said intermediate sleeve; and an orifice member interposed between said axially intermediate small-diameter portion of said intermediate sleeve and said outer cylindrical member, said orifice member and said outer cylindrical member closing said first and second windows and cooperating with said elastic body to define a first and a second annular fluid chamber, said orifice member partially defining an orifice passage for fluid communication between said first and second annular fluid chambers.

2. A cylindrical fluid-filled damping device according to claim 1, wherein said elastic body includes an axially intermediate partition wall by which said first and second annular pockets are spaced apart from each other in said axial direction, and two axial end walls which define axially outer ends of said first and second annular pockets, respectively, each of said axial end walls having two first circumferential portions which are opposed to each other in a first diametric direction of said elastic body, and two second circumferential portions which are opposed to each other in a second diametric direction perpendicular to said first diametric direction and which have an axial dimension different from that of said two first circumferential portions.

3. A cylindrical fluid-filled damping device according to claim 1, wherein said elastic body includes two axial end walls which define axially outer ends of said first and second annular pockets, respectively, each of said two axial end walls having two circumferential portions which are opposed to each other in a diametric direction of said elastic body, said center shaft member having a pair of radially outwardly extending restricting projections which are at least partially embedded in said two circumferential portions of said each axial end wall, respectively.

4. A cylindrical fluid-filled damping device according to claim 1, wherein said orifice member has a dimension as measured in an axial direction of said intermediate sleeve, which dimension is larger than an axial dimension of said axially intermediate small-diameter portion of said intermediate sleeve, said orifice member extending from said axially intermediate portion in axially outer directions into said first and second windows.

5. A cylindrical fluid-filled damping device according to claim 1, wherein said intermediate sleeve further has two large-diameter portions which are located on the axially opposite sides of said axially intermediate small-diameter portion and which have a diameter larger than said small-diameter portion, said pair of first windows being formed between said small-diameter portion and one of said two large-diameter portions, while said pair of second windows being formed between said small-diameter portion and the other of said two large-diameter portions.

6. A cylindrical fluid-filled damping device according to claim 1, wherein said orifice member consists of two semi-cylindrical orifice-defining members which cooperate to partially define said orifice passage in the form of a substantially annular passage.

7. A cylindrical fluid-filled damping device according to claim 6, wherein said two semi-cylindrical orifice-defining members have respective semi-cylindrical outer surfaces and two arcuate grooves formed in said respective semi-cylindrical outer surfaces, said two arcuate grooves cooperating to form a substantially annular groove which is closed by said outer cylindrical member, whereby said substantially annular passage is defined by said two arcuate grooves and said outer cylindrical member.

8. A cylindrical fluid-filled damping device according to claim 1, said intermediate sleeve has an annular abutting portion formed at one of opposite axial ends thereof so as to extend in a radially outward direction, said damping device further comprising an annular buffer block bonded to an axially outer surface of said annular abutting portion.

9. A cylindrical fluid-filled damping device according to claim 1, said outer cylindrical member has an annular abutting portion formed at one of opposite axial ends thereof so as to extend in a radially inward direction, said damping device further comprising an annular buffer block bonded to an axially outer surface of said annular abutting portion.

10. A cylindrical fluid-filled damping device according to claim 1, wherein said first and second annular fluid chambers and said orifice passage are filled with a non-compressible fluid having a kinetic viscosity not higher than 0.1 Pa.s.

* * * * *